A. FREY.
AEROPLANE AND FLYING MACHINE WITH FLAPPING WINGS.
APPLICATION FILED NOV. 14, 1914.
1,431,646.  Patented Oct. 10, 1922.
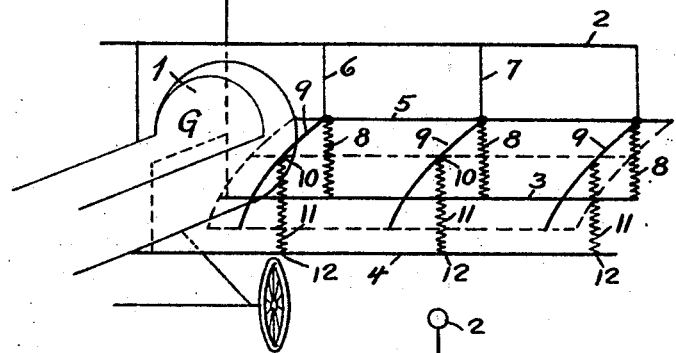
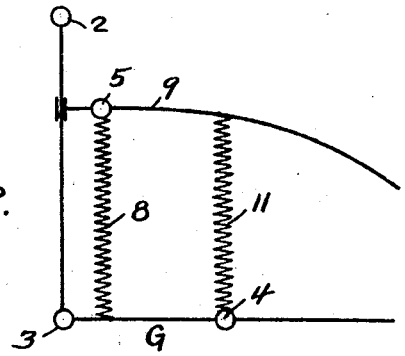
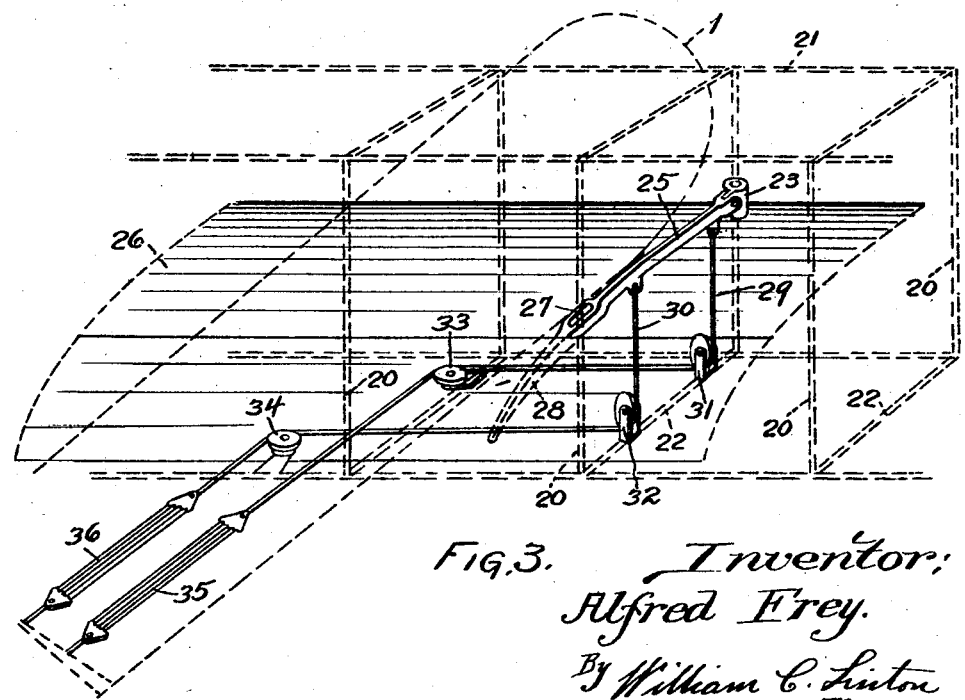
Inventor:
Alfred Frey.
By William C. Linton
Atty.

Patented Oct. 10, 1922.

1,431,646

UNITED STATES PATENT OFFICE.

ALFRED FREY, OF FONTAINEBLEAU, FRANCE, ASSIGNOR TO EDOUARD FAVRE, OF PARIS, FRANCE.

AEROPLANE AND FLYING MACHINE WITH FLAPPING WINGS.

Application filed November 14, 1914. Serial No. 872,243.

*To all whom it may concern:*

Be it known that I, ALFRED FREY, a citizen of the French Republic, residing at Fontainebleau, France, have invented certain new and useful Improvements in Aeroplanes and Flying Machines with Flapping Wings; and I do hereby declare the following to be a full, clear, and exact description of the invention, such as will enable others skilled in the art to which it appertains to make and use the same.

This invention relates to improvements in heavier-than-air flying machines, particularly to that type of machine known in the art as a "mono-plane," having for an object to provide a novel type of wing structure and mounting whereby the course of an airplane equipped with the same will be materially stabilized during flight and will permit of maximum speed thereof to be maintained without distress to the machine.

It is a further object of the invention to provide the wing with a novel form of tensioning means in order that the same will be maintained in its normal position under usual air conditions, but will permit of adjustment of said wing, automatically, to such positions as will compensate for any irregularities in the course and at the same time, stabilize the machine in its flight.

Other objects will be in part obvious and in part pointed out hereinafter.

In order that the invention and its mode of operation may be readily understood by persons skilled in the art, I have in the accompanying illustrative drawings and in the detailed following description based thereon, set out a practical embodiment of the same.

In these drawings:

Figure 1 is a schematical view showing the application of the invention to the fuselage of an airplane; Figure 2 is a similar view showing the mounting of one of the planes; and, Figure 3 is a fragmentary perspective view illustrating a practical adaptation of the invention.

Having more particular reference to the drawings, in connection with which, like characters of reference will designate corresponding parts throughout, having particular reference to the Figures 1 and 2 wherein the invention is schematically illustrated, the fuselage of the airplane so equipped is indicated by the numeral 1 and has rigidly affixed thereto spaced superposed horizontal arms 2 and 3, which as will be noted, are disposed at substantial right angles to the fuselage, while positioned laterally and rearwardly of the arm 3 is a second arm 4, this latter arm also being arranged at right angles to the fuselage 1 and in parallel relation to the arm 3, extending, of course, outwardly from both sides of said fuselage. Arms 2 and 3 are inter-connected and braced with relation to each other by means of suitable trusses 6 and 7, while the arms 3 and 4 are similarly inter-connected as indicated in the Figure 2.

Arranged to extend parallel with the arms 2, 3 and 4 constituting the plane supporting frame work is a plane 5 having the usual camber and preferably, the rear portion thereof formed flexible for an obvious purpose. It is to be understood in this connection, that a pair of the planes 5 are employed in connection with the supporting frame work constituted by the arms 2, 3 and 4, one thereof being arranged upon each side of the fuselage 1 whereby to provide the necessary sustaining bodies for the airplane when in flight. However, for the purpose of convenience, reference will be hereinafter had to but one of these planes 5 and its mounting upon the supporting frame work, such reference being applicable to the remaining plane and its respective mounting upon the supporting frame work.

Transverse supporting arms 9 are secured to the plane 5 in spaced relation throughout its length and carry upon their forward ends pivotal bearing sleeves which are slidably engaged with the vertical trusses 6 and 7 of the arms 2 and 3.

As means for maintaining the plane 5 in its normal position with relation to the supporting frame work, springs 8 are secured at certain of their ends in spaced relation to the forward portion of the plane, while other springs 11 are secured at certain of their ends to the intermediate portions of the arms 9, while the remaining connections of said springs 8 and 11 are made to immovable portions of the supporting frame work, preferably, portions of the trusses between the arms 3 and 4 and said arm 4.

In the form of invention shown in Figure 3, the supporting frame work for the plane herein indicated by the numeral 26 is provided for by means of horizontally and vertically spaced longerons 21, the uppermost set of longerons being supported upon spaced vertical struts 20, while transversals 22 are arranged as between the forward and rearwardly disposed longerons and obviously, serve as means for rigidifying the structure throughout.

The plane 26 is arranged parallel with the supporting frame work therefor and has disposed transversely thereof, throughout its length a plurality of supporting arms, but one of which is shown in the figure and indicated by the numeral 25. The forward extremity of this arm 25 is bifurcated and pivotally connected to a sleeve 24 in slidable relation secured to the adjacent forwardly disposed vertical strut 20, while the intermediate portion thereof is formed with a cleft 27 slidably received therethrough the opposite rearwardly disposed vertical strut 20. Preferably, the rear portion 28 of the arm 25 is formed flexible as is the corresponding portion of the plane 26, in order that adjustment of the camber of said plane may be caused or automatically affected by the pressure exerted thereon created by the head-on resistance of the plane when in flight.

Cables 29 and 30 are secured at certain of their ends in spaced relation to the arm 25 and extend downwardly from the arm over pulleys 31 and 32, thence horizontally over pulleys 33 and 34, all of which are mounted in suitable bearings upon the supporting framework, into engagement with tensioning devices 35 and 36, said tensioning devices consisting herein of rubber or other forms of elastic bodies, the forward ends of which are secured to the remaining ends of said cables 29 and 30, while the remaining or rear ends thereof are secured to immovable portions of the fuselage 1.

The operation of the invention may be reviewed as follows:

Under normal conditions, an airplane equipped with the invention when in flight will travel through the air with the plane 26 in its normal position as shown in Figure 3. However, upon encountering any irregularities, such as swirling air currents, the pressure upon the plane 26 will be materially increased and in order to avoid detrimental resistance to such air-currents, will permit itself to be moved upwardly against the tension of the devices 35 and 36, offering in this way, the least possible detrimental resistance area to the currents and by consequence, preventing damage to the machine and at the same time stabilizing it while in flight. As the machine emerges from the irregular air-currents, it will then come into the normal conditions of its previous course and with removal of excessive pressure of the plane 26, said plane will then be caused to slide downwardly to its normal position upon the supporting structure, due to connection of the tensioned cables 29 and 30 with the arms 25 thereof.

In starting or making a "take-off" in an airplane equipped with the invention, it is to be understood that the rear portion of the planes 26 will be in their lowermost positions with respect to the supporting structure constituted by the longerons 21 and transversals 22 and by consequence, will offer greater resistance to the air as driven there-through, hence, materially increasing the lifting efficiency of the machine so that it will start its flight while the machine is taxying at a comparatively low speed. However, as the machine takes flight, the head-on resistance exerted upon plane 26 will tend to cause the flexible portion of the plane to straighten out so that the lifting efficiency thereof will be slightly detracted from, but at the same time the speed efficiency thereof materially added to.

Manifestly, the construction shown is capable of considerable modification and such modification as is within the scope of my claims, I consider is within the spirit of my invention.

I claim:

1. A monoplane comprising in combination, fuselage, supporting structure consisting of interconnected horizontal longitudinal and transverse arms, planes slidably mounted on vertical portions of said supporting structure and having their rear portions flexible, and tensioning means connected to portions of the planes.

2. A monoplane comprising in combination, fuselage, supporting structure consisting of interconnected horizontal and vertical members, planes arranged parallel with said supporting structure, arms secured in spaced relation to the planes and slidably connected to the forward vertical members of the supporting structure, the intermediate portions of said arms being formed with clefts for slidably receiving certain others of the vertical members therethrough, and tensioning means connected to the free portions of said planes.

3. A monoplane comprising fuselage, supporting structure secured to and extending at right angles from opposite sides of said fuselage, planes slidably mounted on said supporting structure and adapted to displace themselves approximately vertically with respect to said supporting structure, and tensioning means connected to said planes, as and for the purpose set forth.

In testimony whereof I have affixed my signature, in presence of two witnesses.

ALFRED FREY.

Witnesses:
 EMILE BERTRANOF,
 EDWARD W. BISSEL.